April 15, 1930.  F. GELSTHARP  1,754,854
CALCINING APPARATUS
Filed May 17, 1928    2 Sheets-Sheet 1

Patented Apr. 15, 1930

1,754,854

UNITED STATES PATENT OFFICE

FREDERICK GELSTHARP, OF TARENTUM, PENNSYLVANIA, ASSIGNOR TO PITTSBURGH PLATE GLASS COMPANY, A CORPORATION OF PENNSYLVANIA

CALCINING APPARATUS

Application filed May 17, 1928. Serial No. 278,392.

Figure 1:
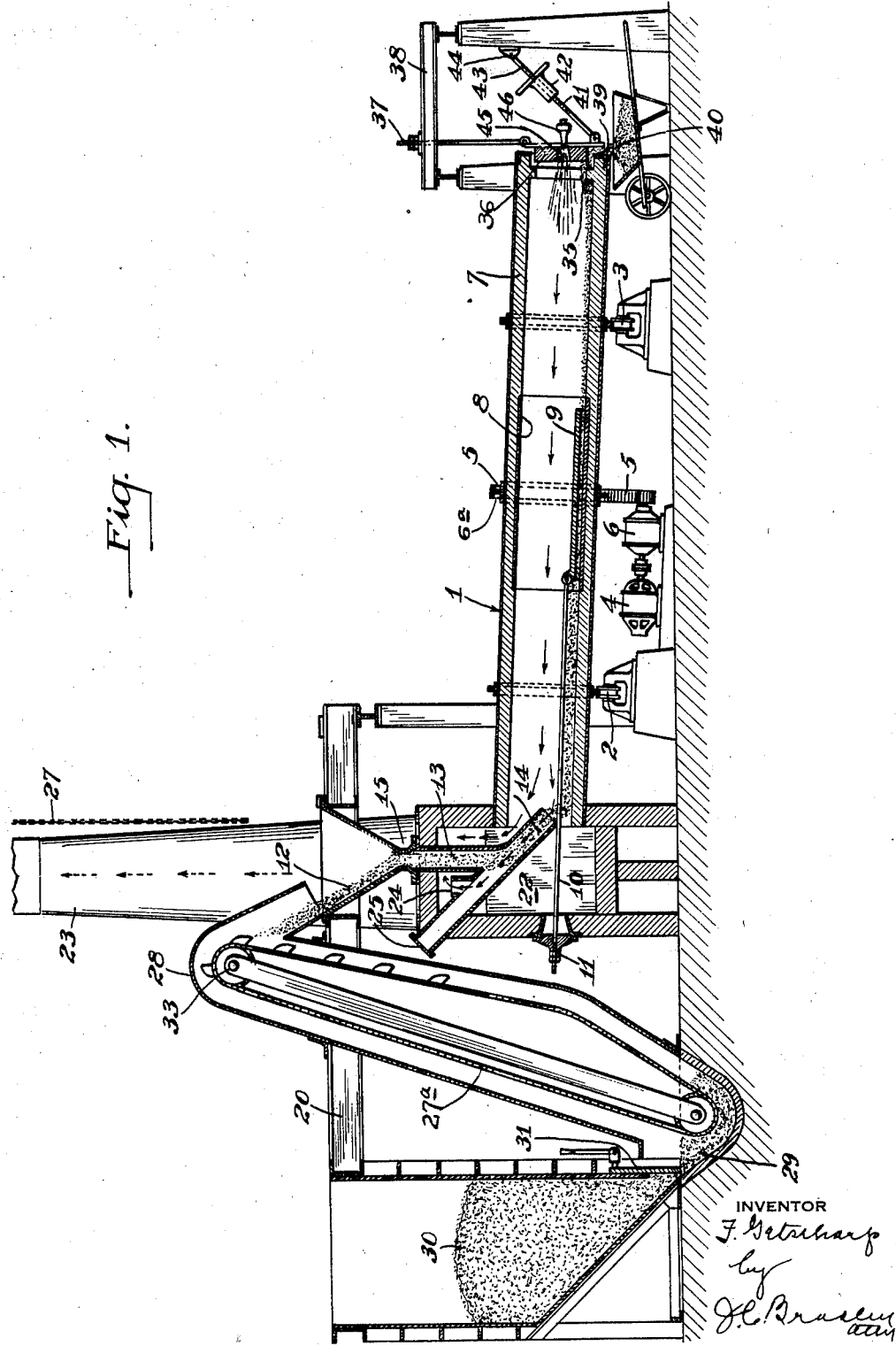
Figure 2:
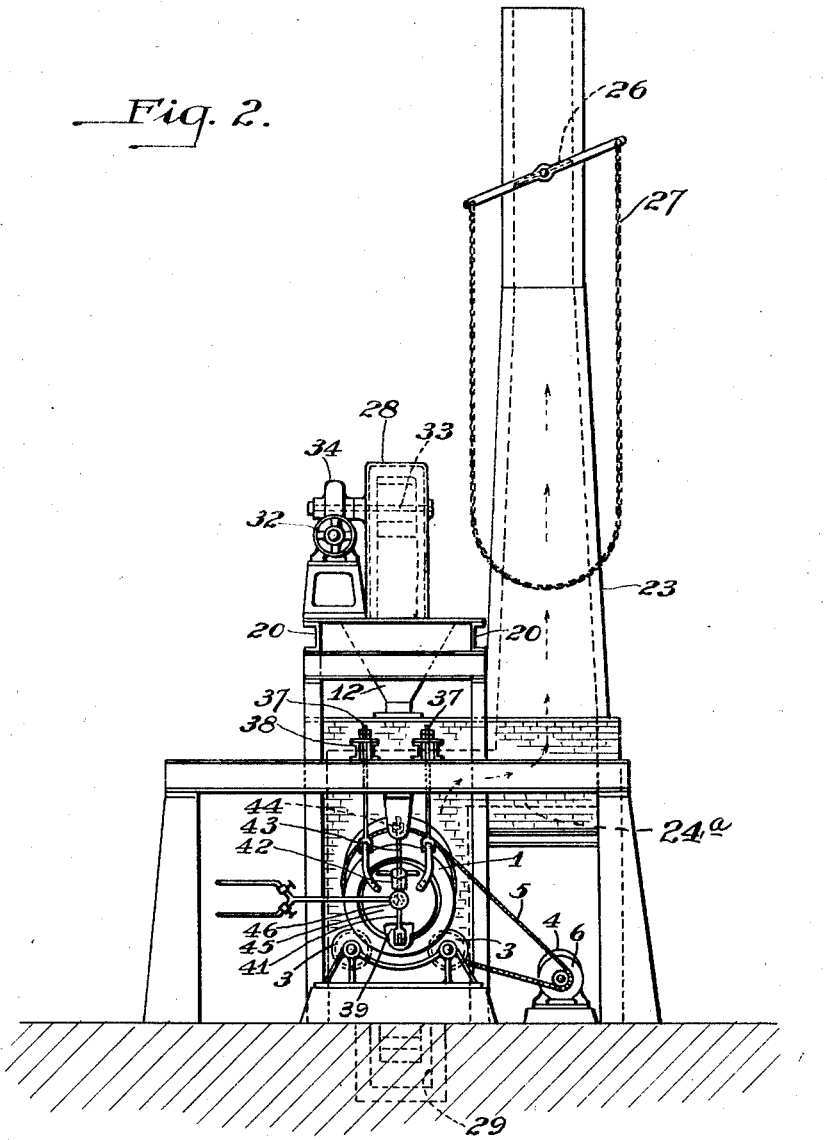

The invention relates to calcining apparatus and is particularly designed to carry out a continuous burning or calcining operation in the manufacture of rouge, but may be used to advantage in the calcining of material other than rouge. The principal objects of the invention are the provision of an apparatus which will operate continuously and efficiently without clogging. A further object is the provision of means whereby the inner surface of the apparatus is effectively protected from wearing away under the action of the means employed for crushing the lumps of material as they pass through the drum. One embodiment of the invention is shown in the accompanying drawings, wherein:

Figure 1 is a longitudinal section of the apparatus, and Fig. 2 is an end elevation.

Referring to the drawings, 1 is a steel shell mounted for rotation on the roller bearings 2, 3 and rotated from the electric motor 4 which drives the sprocket chain 5 through the intermediary of suitable reduction gearing in the casing 6. The chain 5 passes around a sprocket 6ª which encircles the shell. The shell is provided with a refractory lining 7, such as fire brick, which lining is protected at the central portion of the shell by a second lining 8, preferably of heat resisting metal, or if preferred this second lining may extend the entire length of the drum. A gravity crushing bar 9 lies inside the shell 8 being held against longitudinal movement by the bar 10 provided at its end with a suitable nut adjustment 11. This bar serves to crush the lumps of semi-fused and partially oxidized copperas as it advances to the zone in the drum where a complete calcination takes place.

The material is fed to the rear end of the drum from the hopper 12 through the casings 13 and 14. A brick chamber 22 is provided at the rear end of the drum surrounding the casings 13 and 14 and this chamber is connected to an outlet stack 23 by means of a flue 24ª as indicated in Fig. 2. The casing 14 is provided with an opening 24 leading into the chamber 22 so that a part of the hot gases from the drum pass up through this casing. The arrangement of the casings 13 and 14 in the chamber 22 and the provision of the outlet 24 insures a proper elimination of condensed moisture which is otherwise very troublesome as it causes caking in the feed pipe or casing. The outer end of the feed pipe or casing 14 is provided with a removable closure 25 for inspection and cleaning. A damper 26 at the upper end of the stack governs the draft, such damper being operated by means of the chain 27.

Green copperas is fed into the hopper 12 by means of the bucket conveyer 27ª, located in the casing 28, and receiving green copperas in the pit 29 at its lower end, such copperas being supplied from the bin 30 past the gate 31. The conveyer is driven from the motor 32 which drives the shaft 33 through the intermediary of suitable worm reduction gearing in the casing 34.

A hold back ring 35 is provided at the outlet end of the drum, such ring causing the calcined rouge to accumulate so that it does not pass too rapidly through the zone where complete calcination takes place, such zone lying between the metal lining 8 and the ring 35. A door 36 closes the outlet end of the drum, such door being pivotally supported upon the rods 37 carried by the beams 38. The door fits in the outlet end of the drum with a substantial slot or opening 39 at its lower edge, so that a restricted passage is provided for the outflow of the calcined material, such calcined material being received in any suitable conveying means, such as the wheelbarrow 40 shown. The door is opened by means of the rod 41 which is threaded through the hand wheel 42, such hand wheel being swiveled upon the hollow bar 43 into which the rod 41 telescopes. The rod 41 is pivoted at its lower end to the door framing, while the bar 43 is pivoted at its upper end to a bracket 44. An opening 45 is provided through the center of the door through which the gases of combustion from the Bunsen burner 46 are supplied, the drum being heated in this manner, although any other suitable heating means may be employed. The arrows indicate the path of the gases of combustion. The use of the metal lining 8 not only protects the brick lining from abrasion, but also insures a product freer from particles or chips of brick, the lining being extended at least through the portion of the drum having the greatest wear, although the beneficial result is extended by having the lining continued throughout the length of the drum, in which case the ring 35 would be made of heat resisting metal also.

The feed to the hopper 12 and through the pipes 13 and 14 is preferably made intermittent instead of continuous as the intermittent operation, with more of the material handled in a limited period, assists materially in preventing caking and causes the mass to feed away better from the feed end of the drum. This can be done in a wide variety of ways, the method shown involving the use of a conveyer 27ª in which the buckets are provided on a limited length only of the conveyer chain, thus giving an intermittent feed to the hopper 12 and through the pipes 13 and 14.

What I claim is:

1. In combination in calcining apparatus, an inclined rotary metal drum having a refractory lining, a door at the outlet end of the drum mounted for swinging movement about a horizontal axis of rotation, with an opening at its lower edge, means for opening the door and holding it open, and means for feeding the material to be calcined into the higher end of the drum.

2. In combination in calcining apparatus, an inclined rotary drum, a supply hopper adjacent the higher end of the drum, a supply pipe leading from the hopper into such higher end, means for supplying heated gases of combustion at the lower end of the drum, a chamber surrounding said pipe into which the higher end of the drum opens and having an outlet independent of said pipe, and means for withdrawing the gases of combustion from said chamber through said outlet, an opening being provided in said pipe intermediate its ends leading into the chamber so that a portion of the gases of combustion are drawn through the outer end of the pipe.

3. In combination in calcining apparatus, an inclined rotary drum, a supply hopper adjacent the higher end of the drum, a supply pipe leading from the hopper into such higher end, an upwardly extending branch pipe leading from said pipe, means for supplying heated gases of combustion at the lower end of the drum, a chamber surrounding said pipe and the branch pipe into which said branch pipe and the drum open and having an outlet independent of said pipe and said branch pipe, and means for withdrawing the gases of combustion from said chamber through said outlet.

4. In combination in calcining apparatus, an inclined rotary drum, a supply hopper adjacent the higher end of the drum, a vertical supply pipe leading from the hopper, a chamber surrounding said pipe into which the higher end of the drum opens, an inclined pipe into which said pipe discharges with its lower end opening into the drum and its upper end opening to the exterior of the chamber, a closure for such upper end of the pipe, and means for supplying heated gases of combustion to the lower end of the drum.

5. In combination in calcining apparatus, an inclined rotary drum, a supply hopper adjacent the higher end of the drum, a vertical supply pipe leading from the hopper, a chamber surrounding said pipe into which the higher end of the drum opens, an inclined pipe into which said pipe discharges with its lower end opening into the drum and its upper end opening to the exterior of the chamber, a closure for such upper end of the pipe, and means for supplying heated gases of combustion to the lower end of the drum, an opening being provided through the wall of the inclined pipe above the juncture therewith of the vertical supply pipe.

In testimony whereof, I have hereunto subscribed my name this 10th day of April, 1928.

FREDERICK GELSTHARP.